US012573422B2

(12) United States Patent
Yamada

(10) Patent No.: US 12,573,422 B2
(45) Date of Patent: *Mar. 10, 2026

(54) FLEXURE OF SUSPENSION FOR DISK DRIVE AND SUSPENSION FOR DISK DRIVE, THE FLEXURE HAVING AN AREA WITH REDUCED THICKNESS WHERE AN ELECTRONIC COMPONENT IS MOUNTED

(71) Applicant: NHK SPRING CO., LTD., Yokohama (JP)

(72) Inventor: Yukie Yamada, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,044

(22) Filed: Jun. 28, 2024

(65) Prior Publication Data

US 2024/0355354 A1     Oct. 24, 2024

Related U.S. Application Data

(63) Continuation of application No. 18/172,209, filed on Feb. 21, 2023, now Pat. No. 12,051,449.

(30) Foreign Application Priority Data

Feb. 24, 2022     (JP) ................................. 2022-026819

(51) Int. Cl.
G11B 5/48          (2006.01)

(52) U.S. Cl.
CPC ............ G11B 5/484 (2013.01); G11B 5/4833 (2013.01); G11B 5/4853 (2013.01); G11B 5/486 (2013.01); G11B 5/483 (2015.09); G11B 5/4873 (2013.01)

(58) Field of Classification Search
None
See application file for complete search history.

(56) References Cited

U.S. PATENT DOCUMENTS

| | | | |
|---|---|---|---|
| 5,875,071 A | 2/1999 | Erpelding et al. | |
| 6,233,122 B1 | 5/2001 | Summers | |

(Continued)

FOREIGN PATENT DOCUMENTS

| | | |
|---|---|---|
| CN | 106531198 A | 3/2017 |
| CN | 106875958 A | 6/2017 |

(Continued)

OTHER PUBLICATIONS

Chinese Office Action (and an English language translation thereof) dated Jul. 31, 2025, issued in counterpart Chinese Application No. 202310112551.6.

(Continued)

*Primary Examiner* — Craig A. Renner
(74) *Attorney, Agent, or Firm* — Holtz, Holtz & Volek PC

(57) ABSTRACT

A flexure of a suspension for a disk drive includes a metal base and a wiring portion provided along the metal base and including a base insulation layer, a conductor layer overlaid on the base insulation layer, and a cover insulation layer overlaid on the conductor layer. The flexure includes a first area on which an electronic component is mounted and a second area aligned alongside the first area, and the first area includes a thin-walled portion which overlaps the electronic component and having a thickness less than a thickness of the second area.

5 Claims, 8 Drawing Sheets

(56) References Cited

U.S. PATENT DOCUMENTS

| | | | |
|---|---|---|---|
| 6,754,045 | B2 | 6/2004 | Korkowski et al. |
| 7,525,764 | B2 | 4/2009 | Ohsawa et al. |
| 8,276,256 | B1 | 10/2012 | Zhang et al. |
| 8,325,446 | B1 | 12/2012 | Liu et al. |
| 8,379,349 | B1 | 2/2013 | Pro et al. |
| 8,503,133 | B2 | 8/2013 | Arai et al. |
| 8,711,521 | B2 | 4/2014 | Feng et al. |
| 9,218,832 | B2 | 12/2015 | Kawao et al. |
| 9,679,592 | B2 | 6/2017 | Kawao |
| 9,721,598 | B2 | 8/2017 | Kawao et al. |
| 9,761,256 | B2 | 9/2017 | Kawao |
| 9,905,496 | B2 | 2/2018 | Yamada |
| 9,913,373 | B2 | 3/2018 | Fujimura |
| 10,028,378 | B2 | 7/2018 | Tanabe et al. |
| 10,043,541 | B1 | 8/2018 | Dunn et al. |
| 10,381,028 | B2 | 8/2019 | Yamada |
| 10,388,309 | B2 | 8/2019 | Yamada |
| 10,734,018 | B1 | 8/2020 | Uehara |
| 10,964,343 | B2 | 3/2021 | Uehara |
| 11,386,923 | B2 | 7/2022 | Uehara |
| 11,430,474 | B1 | 8/2022 | Nakamiya et al. |
| 11,741,990 | B2 | 8/2023 | Dunn et al. |
| 12,051,449 | B2 * | 7/2024 | Yamada ............... G11B 5/486 |
| 2003/0047534 | A1 | 3/2003 | Takasugi |
| 2004/0181932 | A1 | 9/2004 | Yao et al. |
| 2004/0240114 | A1 | 12/2004 | Takikawa et al. |
| 2005/0030670 | A1 | 2/2005 | Ando et al. |
| 2006/0087768 | A1 | 4/2006 | Erpelding et al. |
| 2010/0007993 | A1 | 1/2010 | Contreras et al. |
| 2014/0368954 | A1 | 12/2014 | Inoue et al. |
| 2017/0339786 | A1 | 11/2017 | Tanabe et al. |
| 2018/0342263 | A1 | 11/2018 | Dunn et al. |
| 2019/0108853 | A1 | 4/2019 | Yamada |
| 2022/0301585 | A1 | 9/2022 | Uehara |
| 2023/0154489 | A1 | 5/2023 | Yamada |
| 2023/0267956 | A1 | 8/2023 | Yamada |

FOREIGN PATENT DOCUMENTS

| | | | |
|---|---|---|---|
| CN | 108962287 | A | 12/2018 |
| JP | 2012099204 | A | 5/2012 |
| JP | 2013235622 | A | 11/2013 |
| JP | 2014139854 | A | 7/2014 |
| JP | 2017107622 | A | 6/2017 |
| JP | 2017107628 | A | 6/2017 |
| JP | 2017117848 | A | 6/2017 |
| JP | 2019071151 | A | 5/2019 |
| JP | 2020129423 | A | 8/2020 |

OTHER PUBLICATIONS

Japanese Office Action (and an English language translation thereof) dated Aug. 26, 2025, issued in counterpart Japanese Application No. 2022-026819.

* cited by examiner

COMPARATIVE EXAMPLE

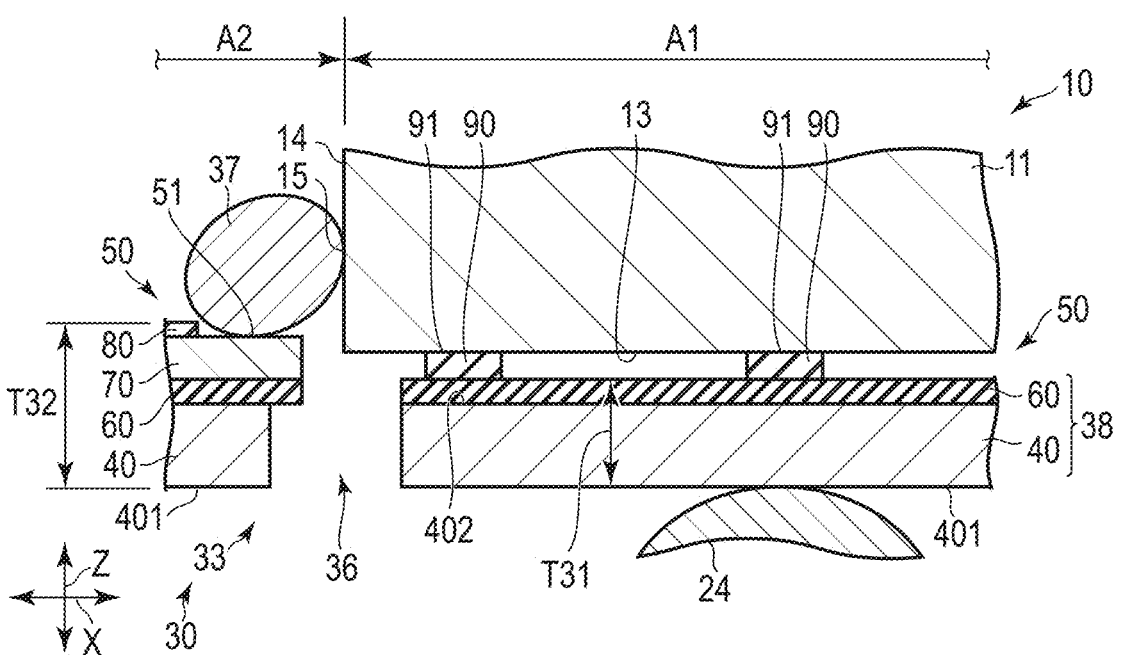
F I G. 11
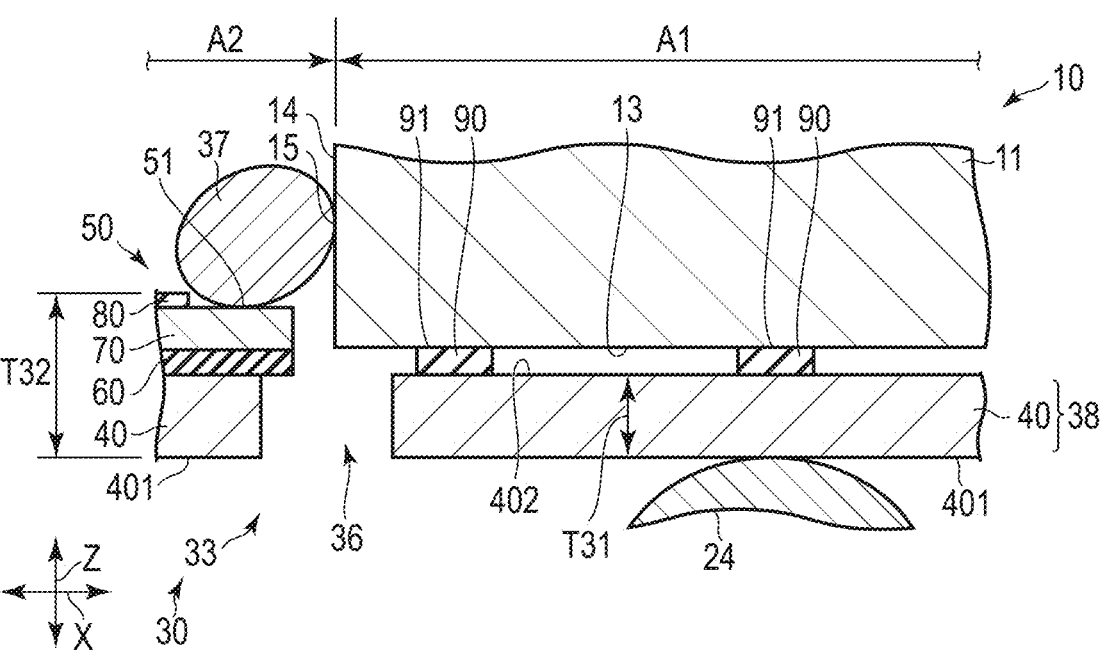
F I G. 12

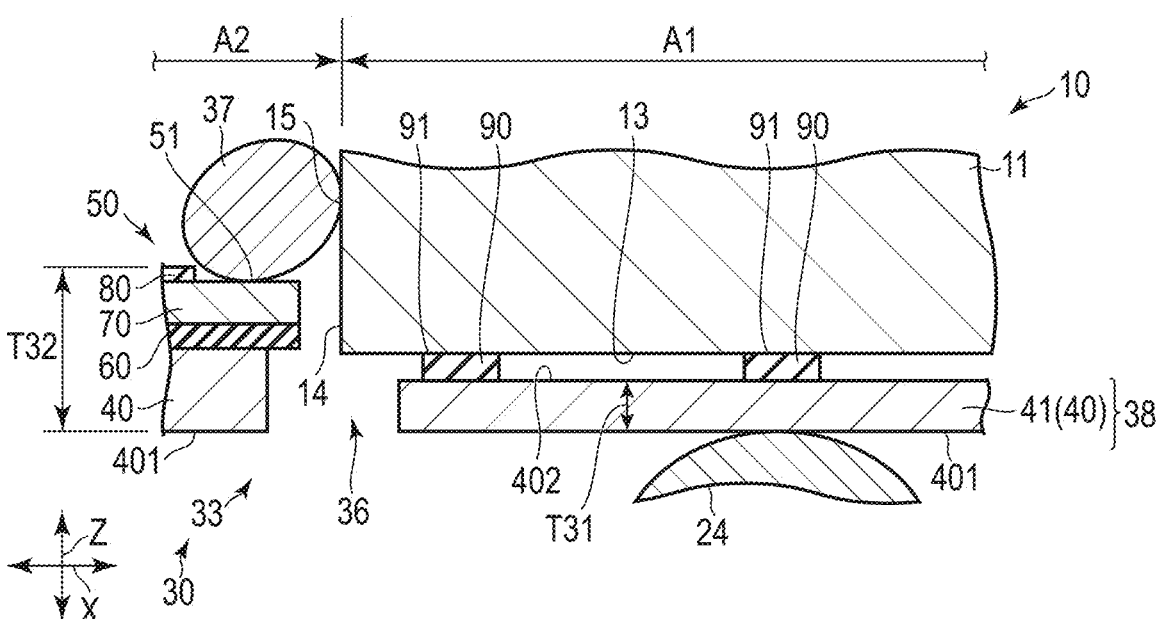
F I G. 13
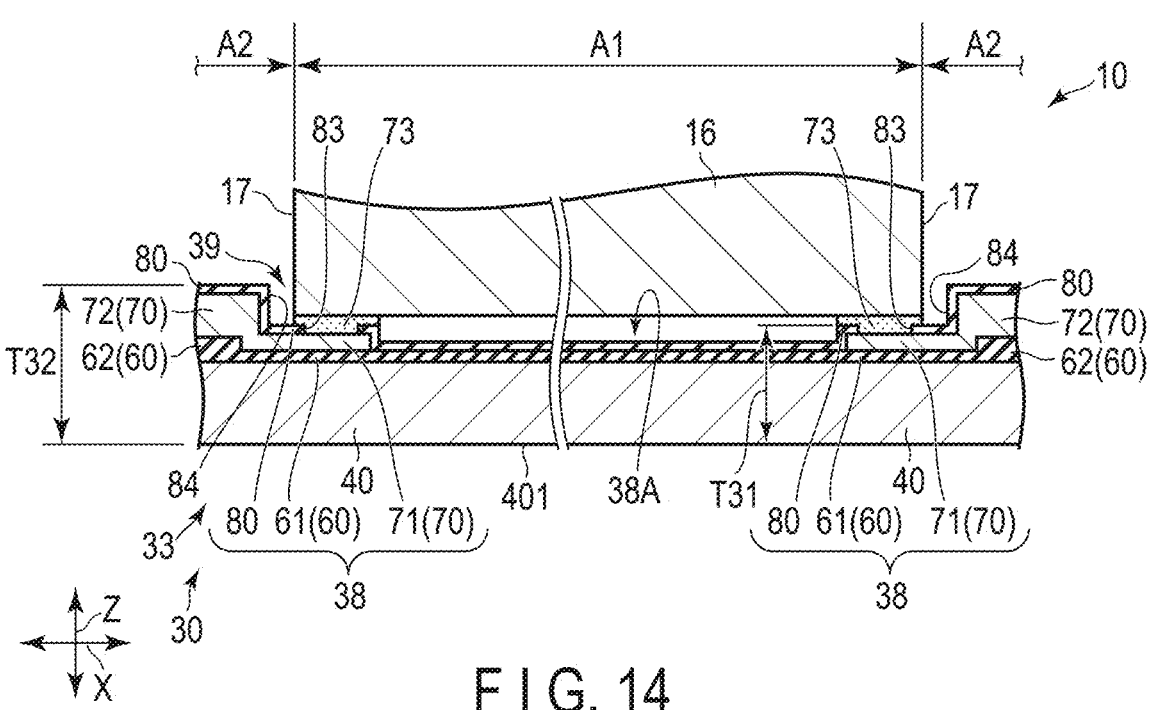
F I G. 14

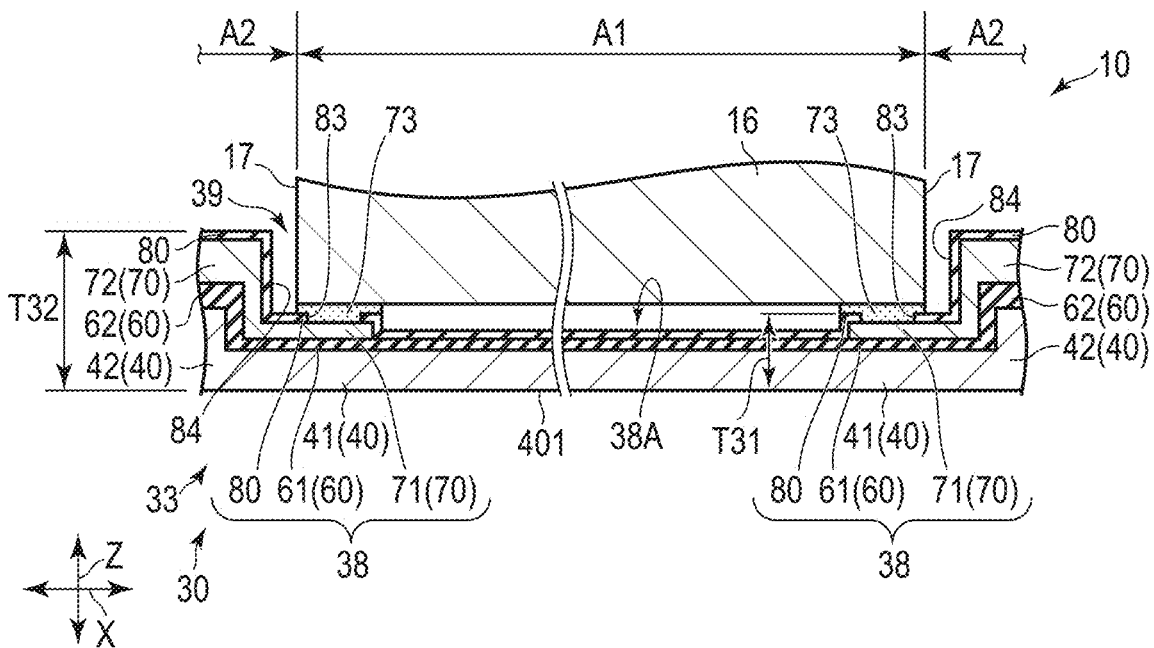
F I G. 15

FLEXURE OF SUSPENSION FOR DISK DRIVE AND SUSPENSION FOR DISK DRIVE, THE FLEXURE HAVING AN AREA WITH REDUCED THICKNESS WHERE AN ELECTRONIC COMPONENT IS MOUNTED

CROSS-REFERENCE TO RELATED APPLICATIONS

This application is a Continuation application of U.S. application Ser. No. 18/172,209, filed Feb. 21, 2023, which is based upon and claims the benefit of priority from prior Japanese Patent Application No. 2022-026819 filed on Feb. 24, 2022, the entire contents of both of which are incorporated herein by reference.

BACKGROUND OF THE INVENTION

1. Field of the Invention

The present invention relates to a flexure of a suspension for a disk drive and a suspension for a disk drive.

2. Description of the Related Art

In information processing devices such as personal computers, hard disk drives (HDDs) are used. Hard disk drives include a magnetic disk that rotates around a spindle and a carriage that pivots around a pivot axis. The carriage includes an arm and pivots around the pivot axis along a track width direction of the disk by a positioning motor such as a voice coil motor.

A suspension for disk drive (to be referred to simply as "suspension" hereinafter) is attached to the arm described above. The suspension includes a load beam and a flexure overlaid on the load beam. Near a distal end portion of the flexure, a gimbal portion is formed, which includes a slider which constitutes a magnetic head.

The slider is provided with an element (transducer) for accessing data such as reading or writing. The load beam, the flexure and the slider constitute a head gimbal assembly. For example, JP 2020-129423 A discloses a disk drive that can increase the number of magnetic disks installed as recording media.

In order to accommodate higher recording densities of disks, it is necessary to further downsize the head gimbal assembly and to be able to position the slider at even higher precision with respect to the recording surface of the disk.

Because of the strong demand for increasing the recording capacity of hard disks, in order to enhance recording density, the number of magnetic disks provided in hard disk drives is increased (the so-called multi-disk).

In order to increase the number of magnetic disks, it is necessary not only to reduce the thicknesses of the disks, but also to decrease the intervals between the disks. But when the intervals between magnetic disks are decreased, such a risk increases that suspensions opposing each other between magnetic disks are brought into contact with each other. Under these circumstances, thinner suspensions are required. Here, there is still room for various improvements in the thinning of the suspensions.

BRIEF SUMMARY OF THE INVENTION

One of the objects of the present invention is to provide a flexure of a suspension for disk drives, which can be made thinner, and such a suspension for disk drives.

According to one embodiment, a flexure of a suspension for a disk drive, comprises a metal base and a wiring portion provided along the metal base and including a base insulation layer, a conductor layer overlaid on the base insulation layer, and a cover insulation layer overlaid on the conductor layer. The flexure includes a first area on which an electronic component is mounted and a second area aligned alongside the first area, and the first area includes a thin-walled portion which overlaps the electronic component and having a thickness less than a thickness of the second area.

The conductor layer may be provided in each of the first area and the second area. The thickness of the conductor layer in the thin-walled portion may be less than the thickness of the conductor layer in the second area. The base insulation layer may be provided in each of the first and second areas, and the thickness of the base insulation layer in the thin-walled portion may be less than the thickness of the base insulation layer in the second area.

The thin-walled portion may include the metal base, the base insulation layer and the cover insulation layer, and the base insulation layer in the thin-walled portion may be in contact with the cover insulation layer. The flexure may further comprise a pillow in which the electronic component is disposed, and the thin-walled portion may include the metal base and the base insulation layer, and the base insulation layer in the thin-walled portion may be in contact with the pillow.

The flexure may further comprise a pillow in which the electronic component is disposed, and the thin-walled portion may include the metal base and the metal base in the thin-walled portion may be in contact with the pillow. The metal base may be provided in each of the first area and the second area, and the thickness of the metal base in the thin-walled portion may be less than the thickness of the metal base in the second area.

The electronic component may be a slider, and the wiring portion in the second area may include a terminal portion electrically connected to the slider. The electronic component may be an actuator.

According to another embodiment, a suspension for a disk drive, comprises the flexure of a suspension for a disk drive, and a load beam which the flexure overlaps.

According to the flexure of the suspension for disk drive and the suspension for disk drive of such a configuration, it is possible to reduce the thicknesses thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a partial cross-sectional view schematically showing a suspension according to the sixth embodiment.

FIG. 12 is a partial cross-sectional view schematically showing a suspension according to the seventh embodiment.

FIG. 13 is a partial cross-sectional view schematically showing a suspension according to the eighth embodiment.

FIG. 14 is a partial cross-sectional view schematically showing a suspension according to the ninth embodiment.

FIG. 15 is a partial cross-sectional view schematically showing a suspension according to the tenth embodiment.

DETAILED DESCRIPTION OF THE INVENTION

Figure 1:
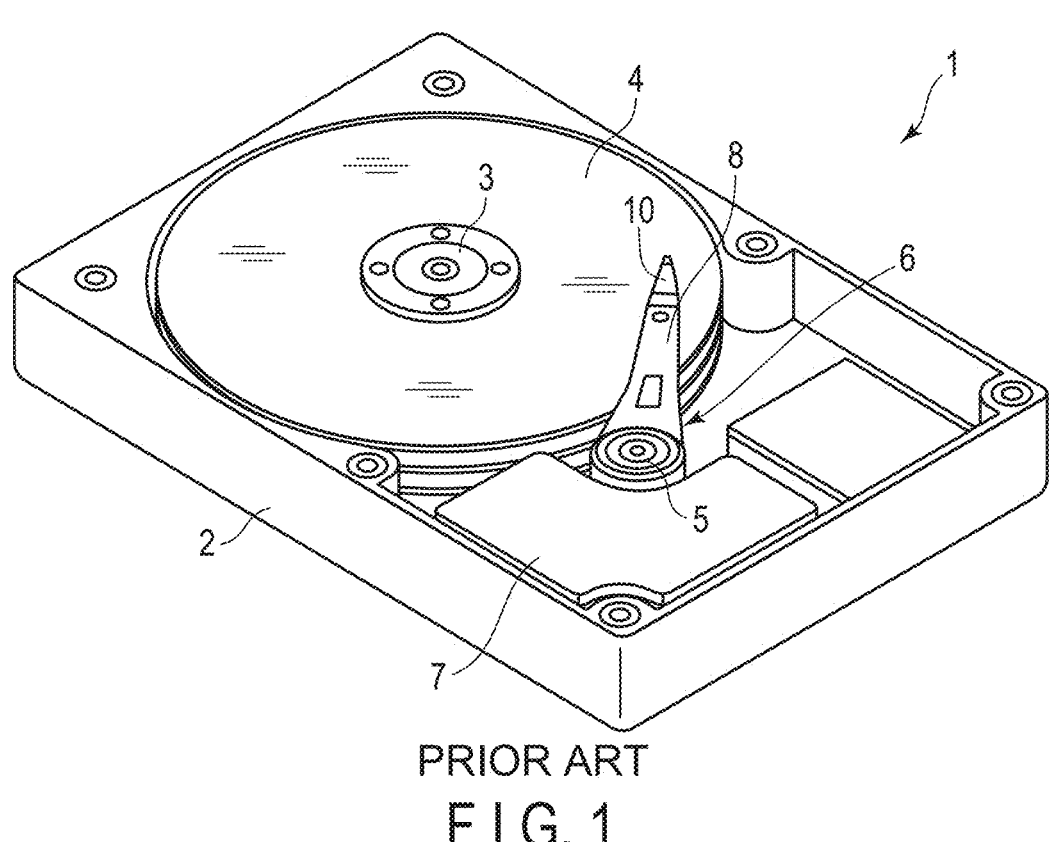
FIG. 1 is a perspective view schematically showing an example of a disk drive.

Each of the embodiments of the invention will be described with reference to the drawings. For the sake of clarity of descriptions, the size, shape and the like of each part may be changed in the drawings to schematically represent the actual embodiment.

First Embodiment

FIG. 1 is a perspective view schematically showing an example of a disk drive (HDD) 1. In the example shown in FIG. 1, the disk drive 1 comprises a case 2, a plurality of magnetic disks (to be referred to simply as disks 4 hereinafter) rotating around a spindle 3, a carriage 6 which can pivot around a pivot axis 5, and a positioning motor (voice coil motor) 7 for driving the carriage 6. The case 2 is sealed by a lid not shown.

Figure 2:
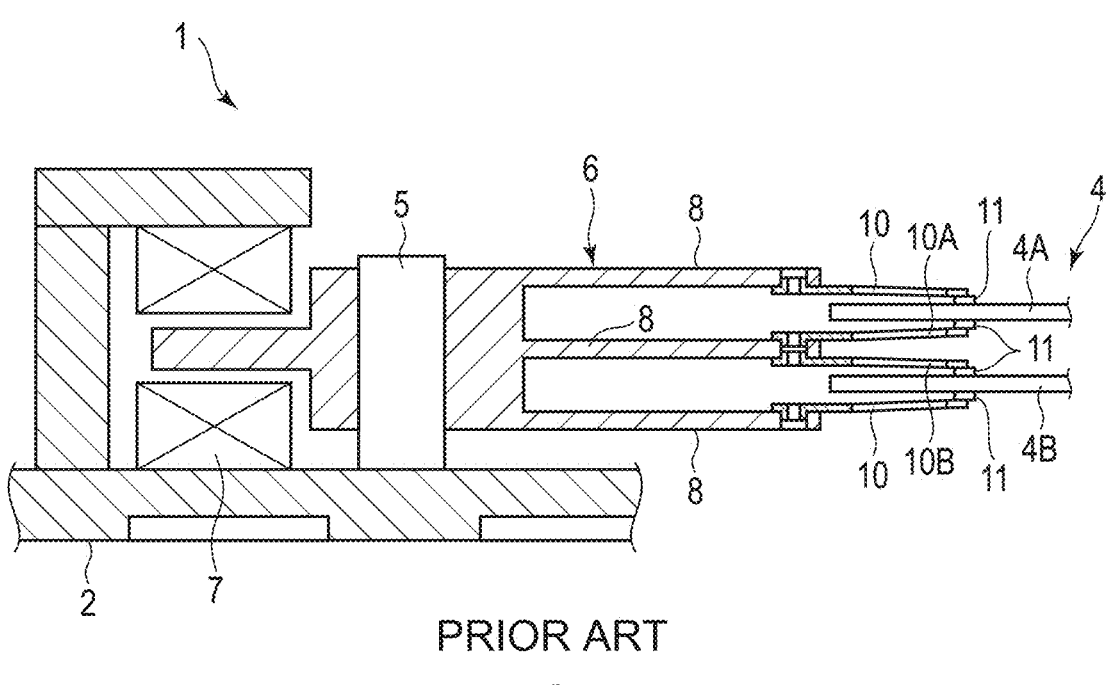
FIG. 2 is a cross-sectional view schematically showing a part of the disk drive.

FIG. 2 is a cross-sectional view schematically showing a part of the disk drive 1. As shown in FIGS. 1 and 2, the carriage 6 includes a plurality (for example, three) of arms 8. The number of arms 8 provided on the carriage 6 is not limited to that of the above-described example.

A suspension 10 is attached to each of the distal end portions of the arms 8. A slider 11, which constitutes a magnetic head, is provided in a distal end portion of each of the suspensions 10.

When the disks 4 rotate at high speed, air flows between each disk 4 and the respective slider 11, thus forming an air bearing. When the carriage 6 is pivoted by the positioning motor 7, the suspension 10 moves in the radial direction of the disk 4, causing the respective slider 11 to move to a desired track on the disk 4.

As shown in FIG. 2, each disk 4 includes a first disk 4A and a second disk 4B. The first disk 4A opposes the second disk 4B with a predetermined distance therebetween. The suspensions 10 provided in the disk drive 1 each include a first suspension 10A and a second suspension 10B.

The first suspension 10A and the second suspension 10B are attached to an arm 8 of the plurality of arms 8, which is located in a center along the thickness direction of the case 2. The first suspension 10A and the second suspension 10B are located between the first disk 4A and the second disk 4B.

In the thickness direction of the case 2, the first suspension 10A opposes the second suspension 10B. The number of disks 4 is not limited to two, but may as well be three or more. The number of the suspensions 10 is changed appropriately according to the number of disks 4.

Figure 3:
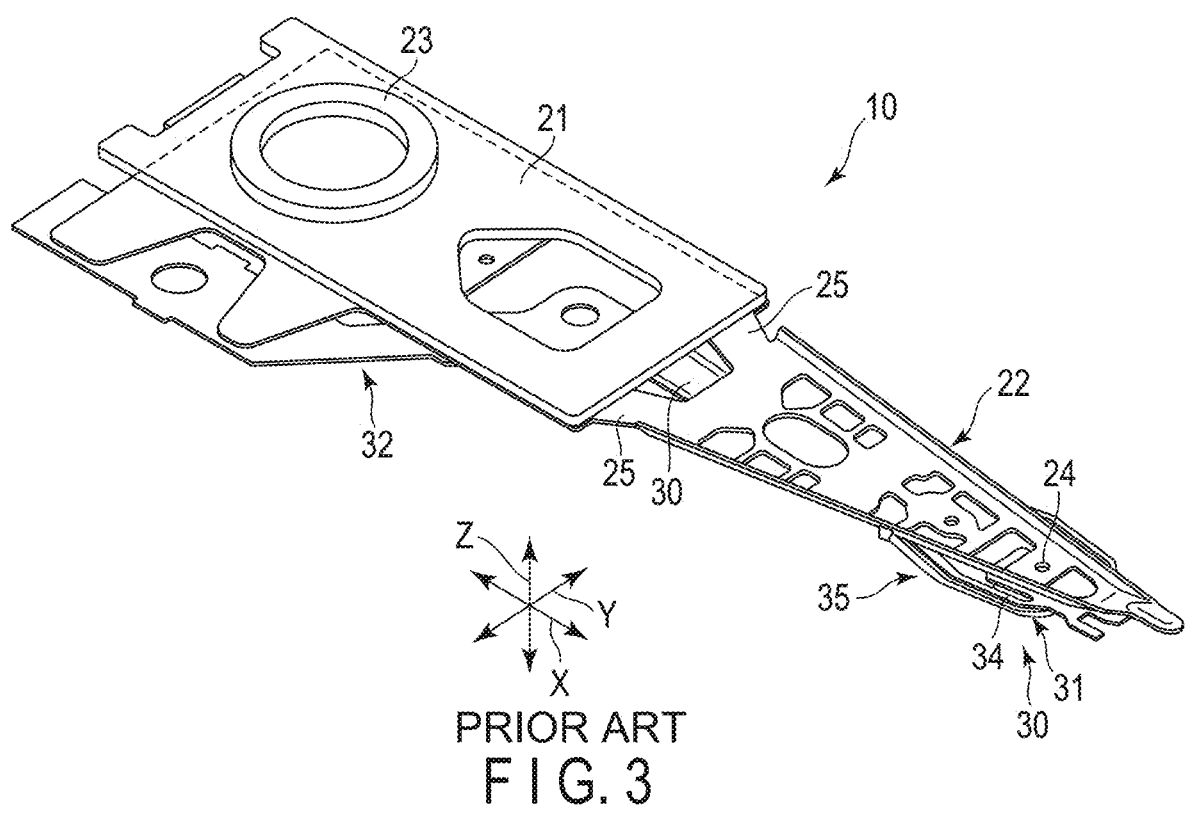
FIG. 3 is a perspective view schematically showing an example of a suspension for a disk drive.
Figure 4:
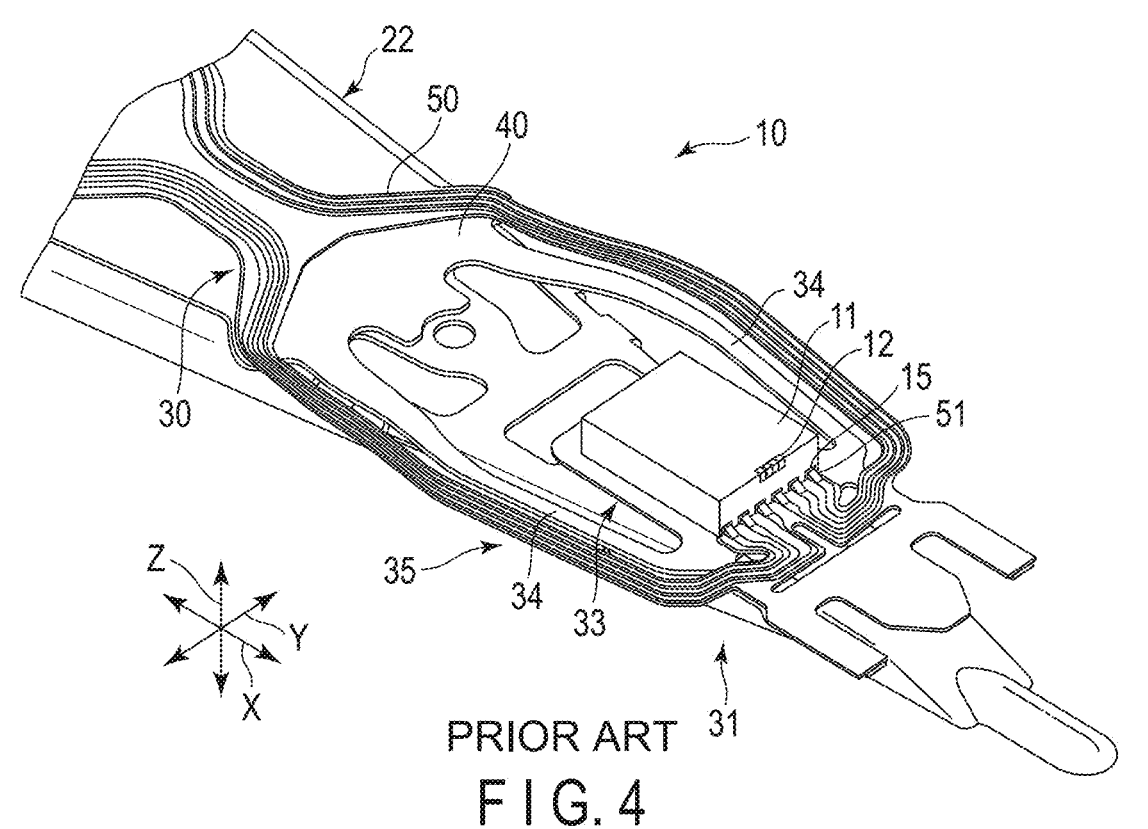
FIG. 4 is a perspective view schematically showing the suspension shown in FIG. 3 as viewed from a distal end thereof.

FIG. 3 is a perspective view schematically showing an example of the suspension 10 for disk drive. FIG. 4 is a perspective view schematically showing the suspension 10 shown in FIG. 3 as viewed from the distal end portion. The suspension 10 comprises a base plate 21, a load beam 22 and a flexure 30 overlaid on the load beam 22. The load beam 22, the flexure 30 and the like constitute a head gimbal assembly.

The load beam 22 and the flexure 30 each extend along a longitudinal direction of the suspension 10. Here, a longitudinal direction of each of the suspension 10, the load beam 22 and the flexure 30 is defined as a longitudinal direction X, and a direction orthogonal to the longitudinal direction X is defined as a transverse direction Y of the suspension 10, load beam 22 and flexure 30.

A direction intersecting (for example, orthogonally) the longitudinal direction X and the transverse direction Y is defined as a thickness direction Z of the suspension 10, load beam 22 and flexure 30 and the like. The thickness direction of the case 2 corresponds to the thickness direction Z. The length along the thickness direction Z may as well be referred to as thickness.

The base plate 21 is formed of, for example, a metal material such as stainless steel. The thickness of the base plate 21 is 120 μm, for example, but is not limited to that of this example. The base plate 21 is provided with a boss portion 23 for attaching the suspension 10 to the respective arm 8 (shown in FIGS. 1 and 2) of the carriage 6.

The load beam 22 is formed of a metal material such as stainless steel. The thickness of the load beam 22 is, for example, 30 to 80 μm. The load beam 22 has a shape which tapers down toward the distal end. Near the distal end of the load beam 22, a dimple 24 is formed.

The load beam 22 includes a spring portion 25 in one end along the longitudinal direction X. The load beam 22 is fixed to the base plate 21 by spot-welding using, for example, a laser at a welding portion not shown. The load beam 22 is elastically supported by the base plate 21 via the spring portion 25.

The flexure 30 is disposed along the base plate 21 and the load beam 22. The flexure 30 is fixed to the base plate 21 and load beam 22 by spot-welding using, for example, a laser, at a welding portion not shown.

The flexure 30 includes a distal end-side portion 31 overlapping the load beam 22 and a flexure tail 32 extending from the distal end-side portion 31 toward behind the base plate 21. The flexure 30 comprises a metal base 40 made of, for example, a thin stainless steel plate and a wiring portion 50 provided along the metal base 40.

The metal base 40 may be referred to as a base layer or a stainless steel layer. The thickness of the metal base 40 is less than the thickness of the load beam 22. The thickness of the metal base 40 is, for example, 15 to 20 μm.

In the distal end-side portion 31, the flexure 30 further includes a tongue portion 33 and a pair of outriggers 34. The pair of outriggers 34 are disposed on respective sides of the tongue portion 33 along the transverse direction Y.

The pair of outriggers 34 are shaped to protrude outwardly from respective sides of the tongue portion 33 along the transverse direction Y. The pair of outriggers 34 are parts of the metal base 40 and their respective outlines are formed by etching, for example.

The slider 11 is mounted on the flexure 30. The slider 11 is an example of an electronic component. At the distal end portion of each slider 11, an element 12 which can convert magnetic signals and electrical signals into each other, such as an MR element, for example, is provided. The elements 12 are used to access the disks 4, such as writing or reading data thereto/from.

The wiring portion 50 is electrically connected to the elements of the slider 11 via terminals 51 for the slider 11. The tongue portion 33, a pair of outriggers 34, and dimples 24, etc., comprise a gimbal portion 35 that freely supports the slider 11 in an oscillating manner.

Figure 5:
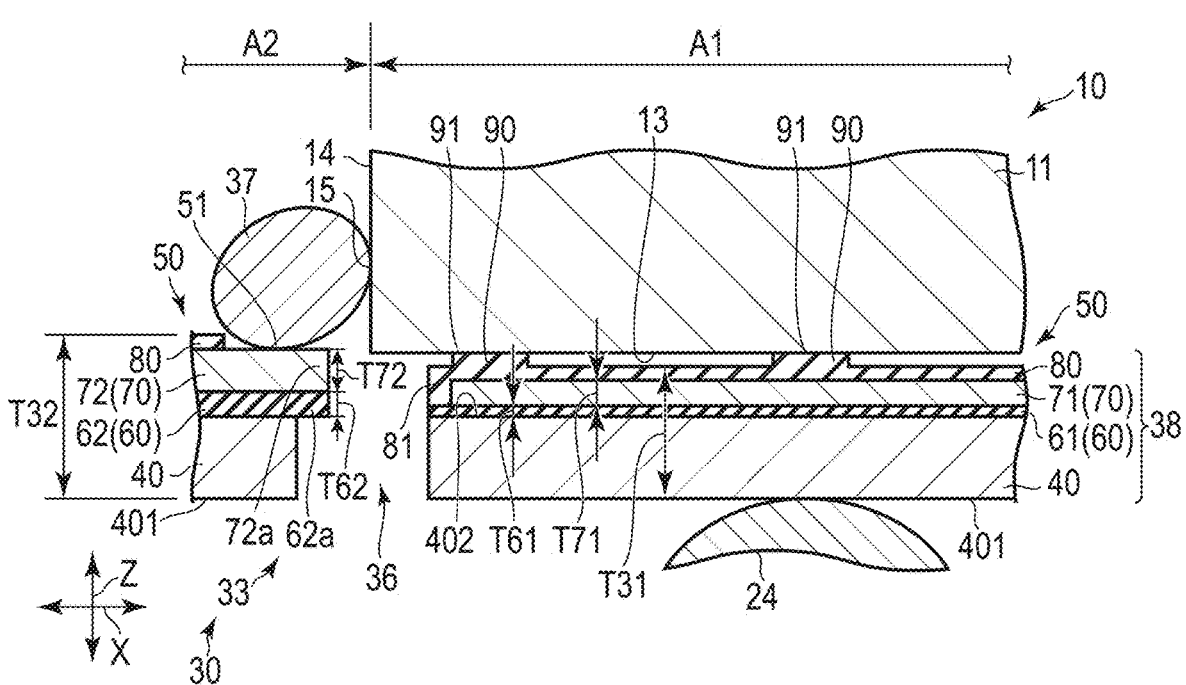
FIG. 5 is a partial cross-sectional view schematically showing the suspension according to the first embodiment.

FIG. 5 is a partial cross-sectional view schematically showing the suspension 10 according to the first embodiment. FIG. 5 shows a cross-section of a part of the suspension 10 including the tongue portion 33, taken along the longitudinal direction X. In the example shown in FIG. 5, an opening 36 is formed in the tongue portion 33.

The slider 11 includes a bottom surface 13 opposing the flexure 30 and a side surface 14 located on one side along the longitudinal direction X. The side surface 14 is provided with a terminal portion 15 for connection to the terminal portion 51 of the flexure 30. An end portion of the slider 11 including the side surface 14 overlaps the opening 36.

As described above, the flexure 30 comprises a metal base 40 and a wiring portion 50. The metal base 40 includes a surface 401 and a surface 402 on an opposite side to the surface 401. The surface 401 is a surface opposing the load beam 22. The dimple 24 protrudes toward the surface 401, and a distal end of the dimple 24 is in contact with the surface 401.

The wiring portion 50 includes a base insulation layer 60 overlaid on the surface 402 of the metal base 40, a conductor layer 70 overlaid on the base insulation layer 60 and a cover insulation layer 80 overlaid on the conductor layer 70.

The base insulation layer 60 and the cover insulation layer 80 are each formed, for example, of an electrically insulating resin material such as polyimide. The thickness of the base insulation layer 60 is, for example, 8 to 10 μm. The thickness of the cover insulation layer 80 is, for example, 4 to 5 μm.

The conductor layer 70 is formed of a metal material of high conductivity, such as copper. Although not shown in the figure, the conductor layer 70 includes a plurality of wires aligned along the transverse direction Y. The wirings include, for example, read wires and write wires. The thickness of the conductor layer 70 is, for example, 6 to 12 μm.

The conductor layer 70 is formed by etching, for example, to form a predetermined pattern along the base insulation layer 60. As another method, for example, the conductor layer 70 may be formed by a layer forming process such as plating, carried out over the base insulation layer 60 masked with a predetermined pattern.

As shown in FIG. 5, the flexure 30 includes a first area A1 in which electronic components (for example, the slider 11 and the like) are mounted and a second area A2 located alongside the first area A1. The example shown in FIG. 5 illustrates a part of each of the first area A1 and the second area A2 aligned along the longitudinal direction X. For example, the size of the first area A1 as viewed from one side along the thickness direction Z is larger than the sizes of the electronic components.

The metal base 40, the base insulation layer 60, the conductor layer 70 and the cover insulation layer 80 are provided respectively in the first area A1 and the second area A2. In the first area A1, the base insulation layer 60, the conductor layer 70 and the cover insulation layer 80 are located between the metal base 40 and the slider 11.

The thickness of the metal base 40 in the first area A1 is equal to the thickness of the metal base 40 in the second area A2. In the thickness direction Z, the surface 401 of the metal base 40 in the first area A1 is located on the same plane as that of the surface 401 of the metal base 40 in the second area A2.

The thickness of the cover insulation layer 80 in the first area A1 is equal to the thickness of the cover insulation layer 80 in the second area A2. The cover insulation layer 80 in the first area A1 has a side portion 81 which covers one end of the conductor layer 70 on an opening 36 side.

The base insulation layer 60 includes a first base insulation portion 61 in the first area A1 and a second base insulation portion 62 in the second area A2. In FIG. 5, the thickness of the first base insulation portion 61 is indicated by a thickness T61 and the thickness of the second base insulation portion 62 is indicated by a thickness T62. The thickness T61 of the first base insulation portion 61 is less than the thickness T62 of the second base insulation portion 62 (T61<T62).

For example, the thickness T61 of the first base insulation portion 61 is three-quarters or less of the thickness T62 of the second base insulation portion 62. Further, as another example, the thickness T61 of the first base insulation portion 61 is a half or less of the thickness T62 of the second base insulation portion 62. For example, the thickness T61 of the first base insulation portion 61 is 4 to 5 μm, whereas the thickness T62 of the second base insulation portion 62 is 8 to 10 μm.

The conductor layer 70 includes a first conductor portion 71 in the first area A1 and a second conductor portion 72 in the second area A2. When the conductor layer 70 is formed by a layer-forming process such as plating, the first conductor portion 71 is formed by less layer forming processing steps as compared to those of the second conductor portion 72.

In FIG. 5, the thickness of the first conductor portion 71 is indicated by a thickness T71 and the thickness of the second conductor portion 72 is indicated by a thickness T72. The thickness T71 of the first conductor portion 71 is less than the thickness T72 of the second conductor portion 72 (T71<T72).

For example, the thickness T71 of the first conductor portion 71 is three-quarters or less of the thickness T72 of the second conductor portion 72. As still another example, the thickness T71 of the first conductor portion 71 is less a half or less of the thickness T72 of the second conductor portion 72. For example, the thickness T71 of the first conductor portion 71 is 3 to 6 μm, whereas the thickness T72 of the second conductor portion 72 is 6 to 12 μm.

The second conductor portion 72 of the conductor layer 70 in the second area A2 includes a terminal portion 51. In the terminal portion 51, one end of the wiring portion which constitutes the conductor layer 70 is located. The terminal portion 51 is not covered by the cover insulation layer 80. The terminal portion 51 is electrically connected to the terminal portion 15 of the slider 11 via a bonding member 37 such as solder.

Although not shown in the figure, the surface of the terminal section 51 is plated. For the plating, a metal material such as Ni/Au is used, for example. The thickness of the plating is, for example, 0.5 to 1.0 μm. As shown in FIG. 5, the second base insulation portion 62 and the second conductor portion 72 include extending portions 62*a* and 72*a*, respectively, extending toward the opening 36.

The flexure 30 further includes a plurality of pillows 90 between the slider 11 and the cover insulation layer 80 in the first area A1. The pillows 90 maintain the height of mounting the slider 11 at constant along the thickness direction Z and form a space for adhesive to accumulate between the flexure 30 and the slider 11.

The pillows 90 are formed, for example, of an electrically insulating resin material such as polyimide. In the example shown in FIG. 5, the pillows 90 are formed to be integrated with the cover insulation layer 80 as one body, but may be formed from a member separate and different from that of the cover insulation layer 80. The thickness of the pillows 90 is, for example, 5 μm.

As shown in FIG. 5, the pillows 90 are aligned along the longitudinal direction X. The pillows 90 each include a surface 91 on which the slider 11 is disposed. The slider 11 is placed on the surfaces 91 of pillows 90 and is bonded to the flexure 30 by an adhesive. The cross-sectional shape of each pillow 90 is rectangular, but the shape is not limited to that of this example.

In the first area A1, the flexure 30 include a thin-walled portion 38 formed by stacking the metal base 40, the first base insulation portion 61, the first conductor portion 71 and the cover insulation layer 80 one on another along the thickness direction Z. From another point of view, the thin-walled portion 38 is included in the first area A1.

The thin-walled portion 38 is formed to reduce the thickness of the flexure 30 in the area where electronic components are mounted. From another point of view, the thin-walled portion 38 overlaps the electronic components in the first area A1, allowing the electronic components to be mounted on the flexure 30 closer to the side of the load beam 22. As shown in FIG. 5, the thin-walled portion 38 overlaps the slider 11 along the thickness direction Z.

The thickness T31 (shown in FIG. 5) of the flexure 30 in the first area A1 is less than the thickness T32 (shown in FIG. 5) of the flexure 30 in the second area A2 (T31<T32). For example, the thickness of the flexure 30 is the length taken from the surface 401 of the metal base 40 to the surface of the cover insulation layer 80, which opposes the bottom surface 13 of the slider 11.

In the example shown in FIG. 5, the thickness T31 of the flexure 30 in the first area A1 corresponds to the thickness of the thin-walled portion 38. In other words, the thickness of the thin-walled portion 38 is less than the thickness T32 of the flexure 30 in the second area A2. Since the first base insulation portion 61 and the first conductor portion 71 are included, the thickness of the wiring portion 50 in the first area A1 is less than the thickness of the wiring portion 50 in the second area A2.

From the viewpoint of the conductor layer 70, the first conductor portion 71 is located closer to the surface 401 of the metal base 40 than the second conductor portion 72 in the thickness direction Z. From the viewpoint of the cover insulation layer 80, the cover insulation layer 80 in the first area A1 is located closer to the surface 401 of the metal base 40 than the cover insulation layer 80 in the second area A2.

From the viewpoint of the pillow 90, in the thickness direction Z, the surface 91 of each pillow 90 is located closer to the surface 401 of the metal base 40 than the cover insulation layer 80 in the second area A2. Further, in the thickness direction Z, the surface 91 of the pillow 90 is located closer to the surface 401 of the metal base 40 than the terminal portion 51.

From the viewpoint of the slider 11, in the thickness direction Z, the bottom surface 13 of the slider 11 is located closer to the surface 401 of the metal base 40 than the cover insulation layer 80 in the second area A2. Further, in the thickness direction Z, the bottom surface 13 of the slider 11 is located closer to the surface 401 of the metal base 40 than the terminal portion 51.

Figure 6:
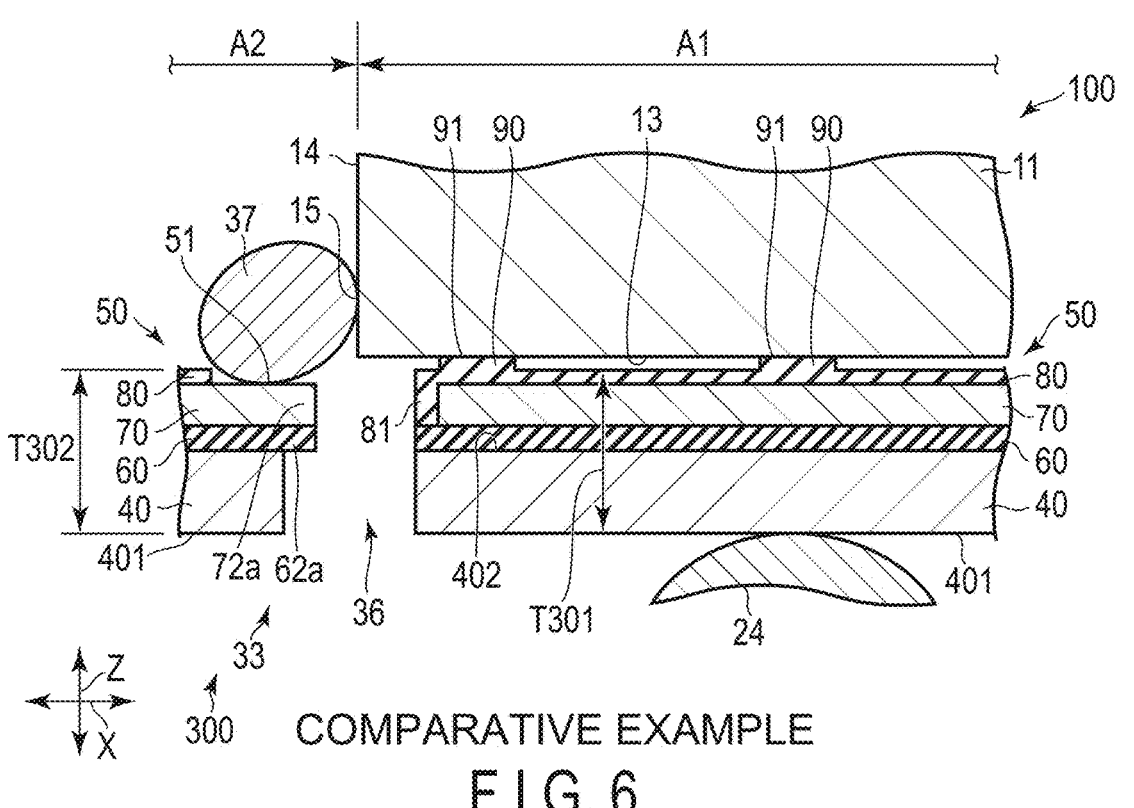
FIG. 6 is a diagram showing a comparative example of the suspension of the first embodiment.

FIG. 6 is a diagram showing a comparative example of the suspension 10 of the first embodiment. As shown in FIG. 6, the flexure 300 of a suspension 100, which is a comparative example, does not include a thin-walled portion 38 in the first area A1. From another point of view, the base insulation layer 60 does not include the first base insulation portion 61 in the first area A1 and the conductor layer 70 does not include the first conductor portion 71 in the first area A1.

Therefore, a thickness T301 (shown in FIG. 6) of the flexure 300 in the first area A1 is equal to a thickness T302 (shown in FIG. 6) of the flexure 300 in the second area A2. The thickness T302 of the flexure 300 in the second area A2 is equal to the thickness T32 of the flexure 30 in the second area A2 described with reference to FIG. 5.

The length from the terminal portion 15 of the slider 11 to the terminal portion 51 of the conductor layer 70 in the thickness direction Z is smaller in the case of the suspension 10 of this embodiment than in the case of the suspension 100 of the comparative example.

That is, in the suspension 10 of this embodiment, the position of the terminal portion 15 of the slider 11 is relatively lower than the position of the terminal portion 51 of the conductor layer 70 as compared to the case of the suspension 100 of the comparative example.

In the suspension 10 of this embodiment, the slider 11 is provided closer to the dimple 24 than the case of the suspension 100 of the comparative example, and thus the thickness of the suspension 10 of the portion, which includes the slider 11 that constitutes the magnetic head, can be reduced. From another point of view, the height of the suspension 10 of this embodiment can be reduced more than the case of the suspension 100 of the comparative example.

The flexure 30 of the suspension 10 configured as described above includes a first area A1 in which the slider 11 is mounted and a second area A2 arranged alongside the first area A1, and the first area A1 includes a thin-walled portion 38 which overlaps the slider 11 and is less thick than the thickness T32 of the second area A2.

In the first area A1, the thin-walled portion 38 is formed to overlap the slider 11, and therefore the thickness of the flexure 30 in the area overlapping the slider 11 can be reduced. In this manner, the thickness of the suspension 10 of the area which includes the slider 11 can be reduced.

As a result, the thickness of the flexure 30 and suspension 10 can be controlled and the flexure 30 and suspension 10 can be made thinner. In this embodiment, the thin-walled portion 38 includes each of the first base insulation portion 61 and the first conductor portion 71, and thus the thickness of the flexure 30 can be further reduced.

In the case of the suspension 10 comprising such a flexure 30, the thickness of the suspension 10 of the portion which includes the slider 11 is reduced, and therefore the interval between disks 4 can be reduced. Thus, the thickness of the disk drive 1 is controlled and the disk drive 1 can be made thinner. From another viewpoint, since the intervals between the respective disks 4 can be reduced, a more number of disks 4 can be installed for a case 2 of the same height as that of the case of this embodiment.

In this embodiment, the thin-walled portion 38 is partially formed in the distal end-side portion 31 of the flexure 30. From another point of view, the size of the thin-walled portion 38 occupies a small portion of the total size of the distal end-side 31 of the flexure 30. Therefore, when the thin-walled portion 38 is formed, there is no substantial effect on characteristics such as vibration characteristics, electrical characteristics and the like of the flexure 30. Therefore, the thickness of the flexure 30 can be reduced while suppressing the effect on the characteristics of the flexure 30.

Further, since the size of the first base insulation portion 61 is small, there is no substantial effect on electrical characteristics and the risk of dielectric breakdown in the base insulation layer 60 can be kept low. Furthermore, even if the first conductor portion 71 is provided in the conductor layer 70 of the first area A1, the risk of dielectric breakdown in the base insulation layer 60 remains substantially unchanged. With this embodiment, the risk of dielectric breakdown can be kept low.

In the suspension 10 of this embodiment, the position of the terminal portion 15 of the slider 11 is relatively lower than the position of the terminal portion 51 of the conductor layer 70 as compared to the suspension 100 of the comparative example. With this structure, the interval between the terminal portion 15 of the slider 11 and the terminal portion 51 of the conductor layer 70 is smaller, thereby making it easy to connect between the terminal portion 15 and the terminal portion 51 by the bonding member 37 and less likely to cause connection errors.

According to this embodiment, it is possible to provide a thinner flexure 30 and a suspension 10 for disk drives. In addition to the descriptions provided above, various other advantageous effects can be obtained from this embodiment.

Note that in this embodiment, the thin-walled portion 38 includes the first base insulation portion 61 and the first conductor portion 71, but it suffices if it includes at least one of the first base insulation portion 61 and the first conductor portion 71. Even in such a case, the thickness T31 of the flexure 30 in the first area A1 can be reduced.

Next, other embodiments will be described. In the other embodiments and modified examples to be described below, structural elements similar to those of the first embodiment will be denoted by the same reference symbols as those used in the first embodiment described above and the detailed descriptions thereof may be omitted or simplified. The flexure 30 of each of the following embodiments can be applied to the suspension 10.

Second Embodiment

Figure 7:
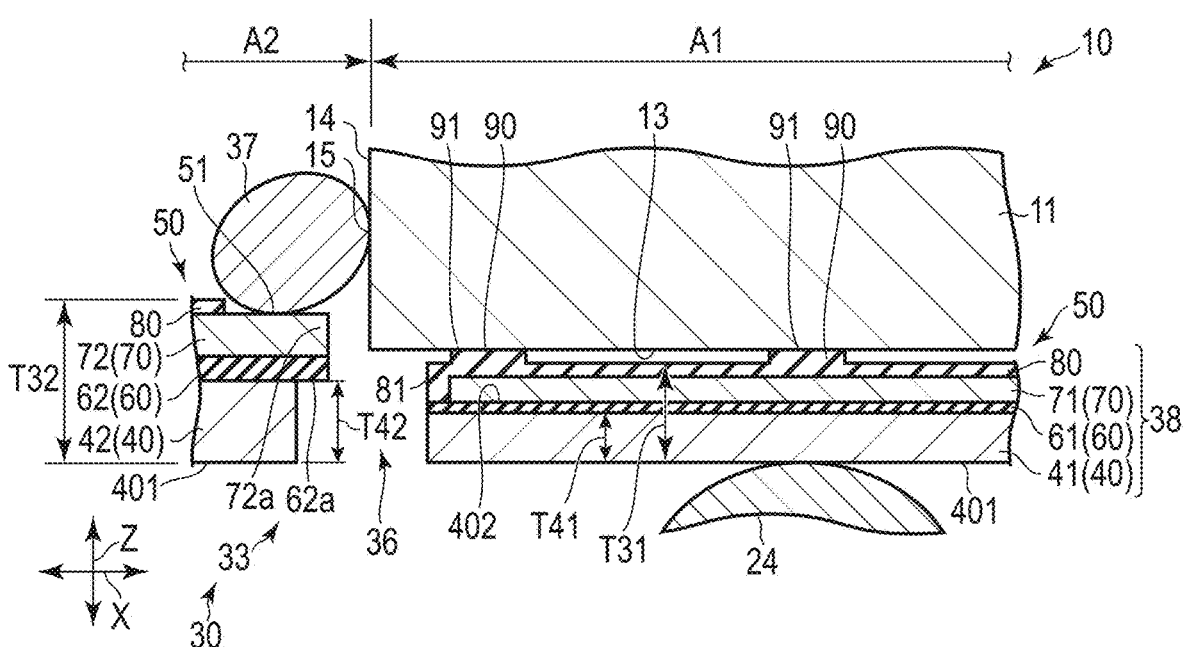
FIG. 7 is a partial cross-sectional view schematically showing a suspension according to the second embodiment.

FIG. 7 is a partial cross-sectional view schematically showing a suspension 10 according to the second embodiment. The second embodiment is different from the first embodiment in that the thickness of the metal base 40 in the first area A1 is less than the thickness of the metal base 40 in the second area A2.

As shown in FIG. 7, the metal base 40 has a first metal base portion 41 in the first area A1 and a second metal base portion 42 in the second area A2. For example, the first metal base portion 41 is formed by half-etching a portion of the metal base 40, which corresponds to the first metal base portion 41 in an etching process.

In FIG. 7, the thickness of the first metal base portion 41 is represented by a thickness T41 and the thickness of the second metal base portion 42 is represented by a thickness T42. The thickness T41 of the first metal base portion 41 is less than the thickness T42 of the second metal base portion 42 (T41<T42).

For example, the thickness T41 of the first metal base portion 41 is three-quarters or less of the thickness T42 of the second metal base portion 42. As still another example, the thickness T41 of the first metal base portion 41 is a half or less the thickness T42 of the second metal base portion 42. For example, the thickness T41 of the first metal base portion 41 is 7 to 10 μm, whereas the thickness T42 of the second metal base portion 42 is 15 to 20 μm.

In the first area A1, the flexure 30 includes a thin-walled portion 38 formed therein by stacking the first metal base portion 41, the first base insulation portion 61, the first conductor portion 71 and the cover insulation layer 80 one on another along the thickness direction Z. As shown in FIG. 7, the thickness T31 of the flexure 30 in the first area A1 is less than the thickness T32 of the flexure 30 in the second area A2.

Further, in the first area A1, the thin-walled portion 38 including the first metal base portion 41 is formed, and therefore the thickness T31 of the flexure 30 in the first area A1 of this embodiment is less than the thickness T31 of the flexure 30 in the first area A1 of the first embodiment (shown in FIG. 5). From the viewpoint of the base insulation layer 60, in the thickness direction z, the first base insulation portion 61 is located closer to the surface 401 of the metal base 40 than the second base insulation portion 62.

In the configuration of the flexure 30 of the second embodiment, advantageous effects similar to those of the first embodiment can be obtained. In the flexure 30 of the second embodiment, the thin-walled portion 38, which includes the first metal base portion 41 is formed in the first area A1, and therefore the thickness of the flexure 30 in the first area A1 can be further reduced.

Even if the first metal base portion 41 is provided in the metal base 40 in the first area A1, the risk of dielectric breakdown in the base insulation layer 60 does not substantially change, and therefore the risk of dielectric breakdown can be kept low with this embodiment.

Furthermore, since the ratio of the first metal base portion 41 occupying in the entire distal end-side portion 31 of the flexure 30 is small, deformation and dimensional variations in the metal base 40 are unlikely to occur, making it possible to provide the flexure 30 with stable quality.

Third Embodiment

Figure 8:
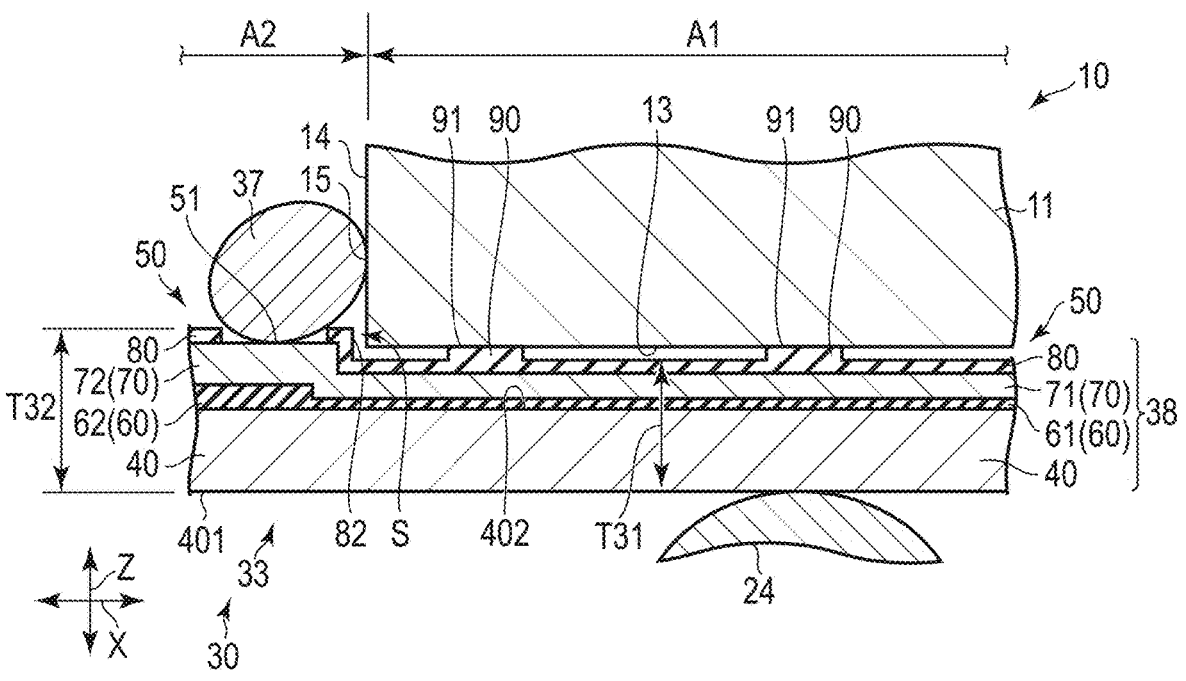
FIG. 8 is a partial cross-sectional view schematically showing a suspension according to the third embodiment.

FIG. 8 is a partial cross-sectional view schematically showing a suspension 10 according to the third embodiment. The third embodiment is different from each of the above-provided embodiments in that in the first area A1, no opening is formed in the tongue portion 33.

As shown in FIG. 8, the metal base 40, the base insulation layer 60, the conductor layer 70 and the cover insulation layer 80 are continuously formed from the first area A1 over to the second area A2. The terminal portion 51 is formed from the conductor layer 70 passing between the slider 11 and the metal base 40 in the first area A1. In the second area A2, the terminal 51 is not covered by the cover insulation layer 80.

Between the terminal portion 51 and the slider 11 in the longitudinal direction X, a step S is formed in the flexure 30. In the second area A2, the cover insulation layer 80 includes a surface 82 opposing the side surface 14 of the slider 11. In the example illustrated in FIG. 8, the surface 82 is parallel to the side surface 14 of the slider 11. Note that the surface 82 need not be parallel to the side surface 14 of the slider 11.

The thickness of the metal base 40 in the first area A1 is equal to the thickness of the metal base 40 in the second area A2. The thickness of the cover insulation layer 80 in the first area A1 is equal to the thickness of the cover insulation layer 80 in the second area A2.

The base insulation layer 60 includes a first base insulation portion 61 in the first area A1 and a second base insulation portion 62 in the second area A2. The conductor layer 70 includes a first conductor portion 71 in the first area A1 and a second conductor portion 72 in the second area A2.

In the first area A1, the flexure 30 includes a thin-walled portion 38 formed therein by stacking the metal base 40, the first base insulation portion 61, the first conductor portion 71 and the cover insulation layer 80 one on another along the thickness direction Z.

As shown in FIG. 8, the thickness T31 of the flexure 30 in the first area A1 is less than the thickness T32 of the flexure 30 in the second area A2. In the configuration of the flexure 30 of the third embodiment as well, advantageous effects similar to each of the embodiments described above can be obtained.

Fourth Embodiment

Figure 9:
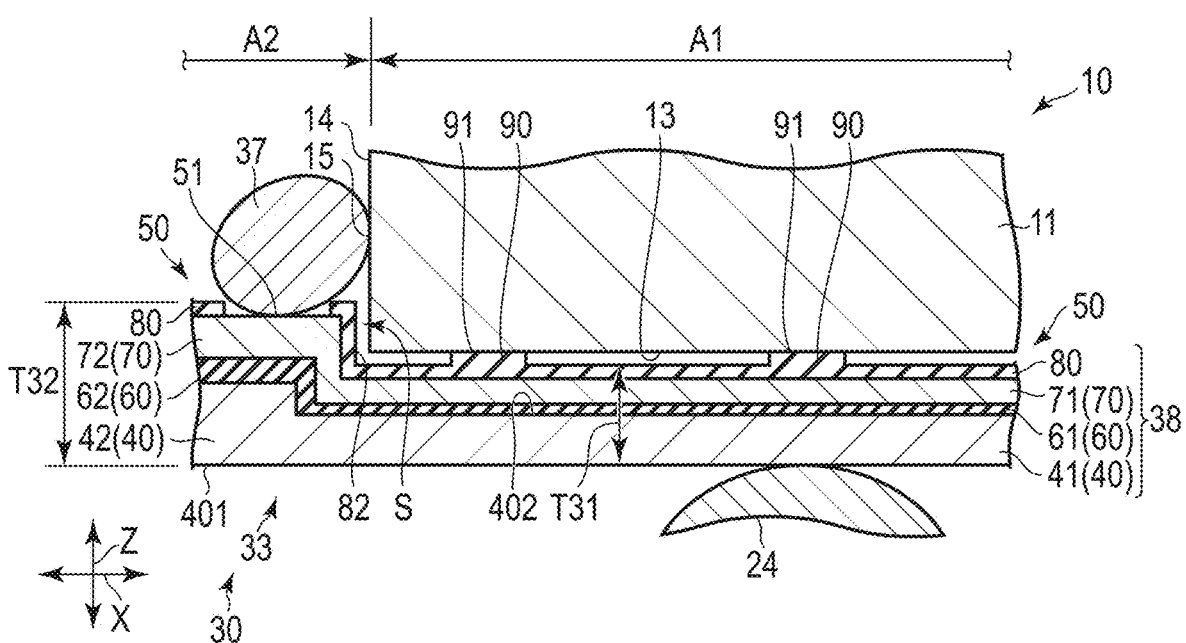
FIG. 9 is a partial cross-sectional view schematically showing a suspension according to the fourth embodiment.

FIG. 9 is a partial cross-sectional view schematically showing a suspension 10 according to the fourth embodiment. The fourth embodiment is different from the third embodiment in that the thickness of the metal base 40 in the first area A1 is less than the thickness of the metal base 40 in the second area A2.

As shown in FIG. 9, the metal base 40 includes a first metal base portion 41 in the first area A1 and a second metal base portion 42 in the second area A2. In the first area A1, the flexure 30 includes a thin-walled portion 38 formed therein by stacking the first metal base portion 41, the first base insulation portion 61, the first conductor portion 71 and the cover insulation layer 80 one on another along the thickness direction Z.

As shown in FIG. 9, the thickness T31 of the flexure 30 in the first area A1 is less than the thickness T32 of the flexure 30 in the second area A2. Further, in the first area A1, the thin-walled portion 38 including the first metal base portion 41 is formed, the thickness T31 of the flexure 30 in the first area A1 in this embodiment is less than the thickness T31 of the flexure 30 in the first area A1 of the third embodiment (shown in FIG. 8).

In the configuration of the flexure 30 of the fourth embodiment as well, advantageous effects similar to each of the embodiments described above can be obtained. Note that in the third and fourth embodiments, the thin-walled portion 38 includes the first base insulation portion 61 and the first conductor portion 71, but it suffices if it includes at least one of the first base insulation portion 61 and the first conductor portion 71. Even in such a case, the thickness T31 of the flexure 30 in the first area A1 can be reduced.

Fifth Embodiment

Figure 10:
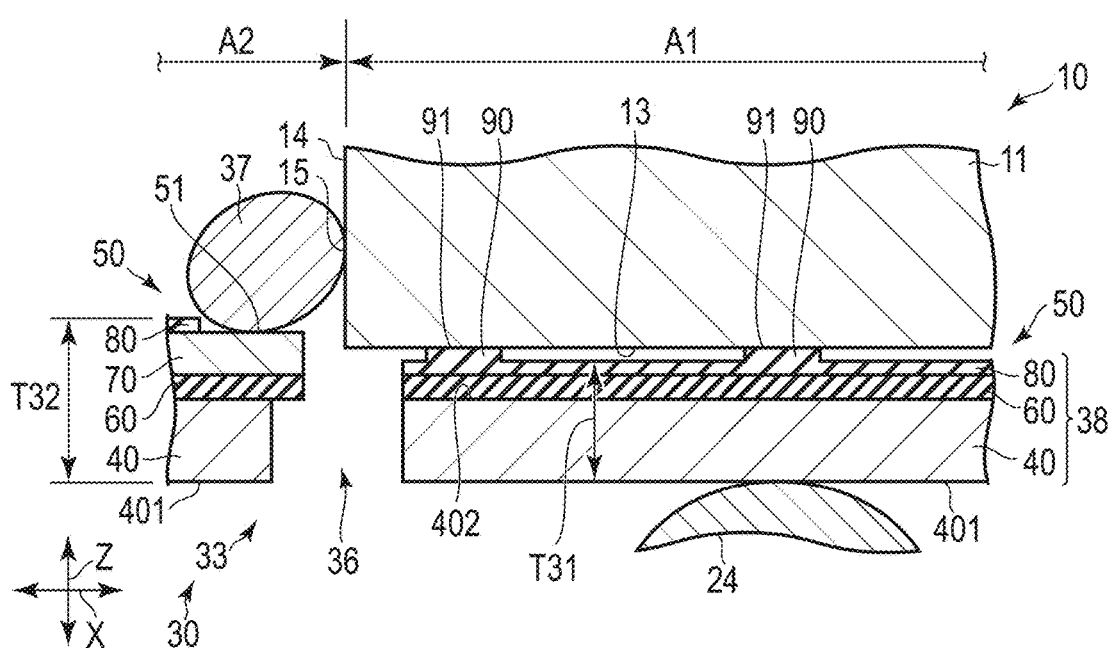
FIG. 10 is a partial cross-sectional view schematically showing a suspension according to the fifth embodiment.

FIG. 10 is a partial cross-sectional view schematically showing a suspension 10 according to the fifth embodiment. Note that the fifth embodiment to the eighth embodiment are different from each of the above-provided embodiments in that the flexure 30 does not include at least one of the base insulation layer 60, the conductor layer 70 and the cover insulation layer 80 in the first area A1.

As shown in FIG. 10, the metal base 40 is provided in each of the first area A1 and the second area A2. The wiring portion 50 includes a base insulation layer 60 and a cover insulation layer 80 in the first area A1, and a base insulation layer 60, a conductor layer 70 and a cover insulation layer 80 in the second area A2.

More specifically, the wiring portion 50 does not include a conductor layer 70 in the first area A1. In the first area A1, the flexure 30 includes a thin-walled portion 38 formed therein by stacking the metal base 40, the base insulation layer 60 and the cover insulation layer 80 one on another along the thickness direction Z. The base insulation layer 60 in the thin-walled portion 38 is in contact with the cover insulation layer 80.

The thickness of the metal base 40 in the first area A1 is equal to the thickness of the metal base 40 in the second area A2. The thickness of the base insulation layer 60 in the first area A1 is equal to the thickness of the base insulation layer 60 in the second area A2. The thickness of the cover insulation layer 80 in the first area A1 is equal to the thickness of the cover insulation layer 80 in the second area A2.

For example, the thickness of the metal base 40 is equal to the thickness T42 of the second metal base portion 42 described above, and the thickness of the base insulation layer 60 is equal to the thickness T62 of the second base insulation portion 62. The thickness of the cover insulation layer is equal to the thickness of the cover insulation layer of each of the embodiments described above.

As shown in FIG. 10, the wiring portion 50 does not include a conductor layer 70 in the first area A1, and therefore the thickness T31 of the flexure 30 in the first area A1 is less than the thickness T32 of the flexure 30 in the second area A2.

In the example illustrated in FIG. 10, the thickness T31 of the flexure 30 in the first area A1 corresponds to the thickness of the thin-walled portion 38. In other words, the thickness of the thin-walled portion 38 is less than the thickness T32 of the flexure 30 in the second area A2. Without the conductor layer 70, the thickness of the wiring portion 50 in the first area A1 is less than the thickness of the wiring portion 50 in the second area A2.

In the configuration of the flexure 30 of the fifth embodiment as well, advantageous effects similar to each of the embodiments described above can be obtained. In the fifth embodiment, since the wiring portion 50 does not include a conductor layer 70 in the first area A1, the risk of dielectric breakdown can be lowered.

Sixth Embodiment

FIG. 11 is a partial cross-sectional view schematically showing a suspension 10 according to the sixth embodiment. The sixth embodiment is different from the fifth embodiment in that the wiring portion 50 of the flexure 30 does not include a cover insulation layer 80 in the first area A1.

In the first area A1, the flexure 30 includes a thin-walled portion 38 formed therein by stacking the metal base 40 and the base insulation layer 60 one on another along the thickness direction Z. The base insulation layer 60 in the thin-walled portion 38 is in contact with a plurality of pillows 90. As shown in FIG. 11, the thickness T31 of the flexure 30 in the first area A1 is less than the thickness T32 of the flexure 30 in the second area A2.

Further, since the wiring portion 50 does not have a cover insulation layer 80 in the first area A1, the thickness T31 of the flexure 30 in the first area A1 of this embodiment is less than the thickness T31 of the flexure 30 in the first area A1 of the fifth embodiment (shown in FIG. 10).

In the configuration of the flexure 30 of the sixth embodiment as well, advantageous effects similar to each of the embodiments described above can be obtained. Note that when the first base insulation portion 61 described in the first embodiment is applied to the fifth and sixth embodiments, the thickness T31 of the flexure 30 in the first area A1 can be further reduced.

Seventh Embodiment

FIG. 12 is a partial cross-sectional view schematically showing a suspension 10 according to the seventh embodiment. The seventh embodiment is different from the sixth embodiment in that the flexure 30 does not include a cover insulation layer 80 in the first area A1. That is, in the seventh embodiment, the flexure 30 does not include a wiring portion 50 in the first area A1.

In the first area A1, the flexure 30 includes a thin-walled portion 38 formed from the metal base 40. The metal base 40 in the thin-walled portion 38 is in contact with the pillows 90. A part of a surface 402 of the metal base 40 opposes the bottom surface 13 of the slider 11.

As shown in FIG. 12, the thickness T31 of the flexure 30 in the first area A1 is less than the thickness T32 of the flexure 30 in the second area A2. In this embodiment, the thickness T31 of the flexure 30 in the first area A1 corresponds to the thickness of the metal base 40.

Further, since the flexure 30 does not include a wiring portion 50 in the first area A1, the thickness T31 of the flexure 30 in the first area A1 of this embodiment is less than the thickness T31 of the flexure 30 in the first area A1 of the sixth embodiment (shown in FIG. 11). In the configuration of the flexure 30 of the seventh embodiment as well, advantageous effects similar to each of the embodiments described above can be obtained.

Eighth Embodiment

FIG. 13 is a partial cross-sectional view schematically showing a suspension 10 according to the eighth embodiment. The eighth embodiment is different from the seventh embodiment in that the thickness of the metal base 40 in the first area A1 is less than the thickness of the metal base 40 in the second area A2.

As shown in FIG. 13, in the first area A1, the flexure 30 includes a thin-walled portion 38 formed therein from the first metal base portion 41. The first metal base portion 41 is in contact with a plurality of pillows 90.

As shown in FIG. 13, the thickness T31 of the flexure 30 in the first area A1 is less than the thickness T32 of the flexure 30 in the second area A2. In this embodiment, the thickness T31 of the flexure 30 in the first area A1 corresponds to the thickness T41 of the first metal base portion 41.

Further, in the first area A1, the thin-walled portion 38 is formed from the first metal base portion 41, and therefore the thickness T31 of the flexure 30 in the first area A1 of this embodiment is less than the thickness T31 of the flexure 30 in the first area A1 of the seventh embodiment (shown in FIG. 12).

In the configuration of the flexure 30 of the eighth embodiment as well, advantageous effects similar to each of the embodiments described above can be obtained. Note that the configuration described in each of the fifth embodiment to the eighth embodiment can be applied to the case where the opening 36 is not formed in the tongue portion 33. In each of the fifth embodiment to the seventh embodiment as well, the first metal base portion 41 can be applied in the first area A1.

Ninth Embodiment

FIG. 14 is a partial cross-sectional view schematically showing a suspension 10 according to the ninth embodiment. In the ninth embodiment, the flexure 30 includes a first area A1 in which the actuator 16 is mounted.

The actuator 16 is an example of electronic components. In this embodiment, the actuator 16 is, for example, a micro-actuator and is formed from a piezoelectric material such as lead zirconate titanate (PZT).

The actuator 16 is mounted on, for example, a tongue portion 33 (shown in FIG. 3). The actuator has a function of pivoting the tongue portion 33 in a sway direction. For example, the actuator is located on respective sides of the slider 11 along in the transverse direction Y.

As shown in FIG. 14, the flexure 30 includes a first area A1 in which the actuator 16 is mounted and second areas A2 located along respective sides of the first area A1. For example, in the longitudinal direction X, the first area A1 is located between the second areas A2.

The metal base 40, the base insulation layer 60, the conductor layer 70 and the cover insulation layer 80 are provided in the first area A1 and the second areas A2, respectively. In the first area A1, the base insulation layer 60, the conductor layer 70 and the cover insulation layer 80 are located between the metal base 40 and the actuator 16. As shown in FIG. 14, the metal base 40, the base insulation layer 60, the conductor layer 70 and the cover insulation layer 80 are continuously formed from the first area A1 over to the second area A2.

The thickness of the metal base 40 in the first area A1 is equal to the thickness of the metal base 40 in the second areas A2. The thickness of the cover insulation layer 80 in the first area A1 is equal to the thickness of the cover insulation layer 80 in the second areas A2.

The base insulation layer 60 includes a first base insulation portion 61 in the first area A1 and a second base insulation portion 62 in the second areas A2. The conductor layer 70 includes a first conductor portion 71 in the first area A1 and a second conductor portion 72 in the second areas A2. As shown in FIG. 14, there is a portion in the first area A1 where the first conductor portion 71 is not formed.

In the first area A1, connection portions 73 (for examples, two) are formed to electrically connect the actuator 16 and the conductor layer 70 to each other. The connection portions 73 are provided respectively, for example, in holes 83 formed in the cover insulation layer 80 and penetrate the cover insulation layer 80 in the thickness direction Z. The connection portions 73 are formed, for example, of a conductive adhesive.

As shown in FIG. 14, in the flexure 30, a recess portion 39 is formed. For example, the recess portion 39 is a portion where the actuator 16 is to be mounted in the flexure 30 is recessed toward the load beam 22 side. The recess portion 39 is formed from the metal base 40, the base insulation layer 60, conductor layers 70 and cover insulation layers 80.

In the second area A2, the cover insulation layers 80 each include a surface 84 opposing the side surfaces 17 of the actuator 16. In the example illustrated in FIG. 14, the surfaces 84 are parallel to the side surfaces 17 of the actuator 16. Note that the surfaces 84 need not be parallel to the side surfaces 17 of the actuator 16.

In the first area A1, thin-walled portions 38 are formed in the flexure 30 by stacking the metal base 40, the first base insulation portion 61, first conductor portions 71, and cover insulation layers 80 one on another along the thickness direction Z.

Further, the thin-walled portions 38 include a portion 38A located between the connection portions 73 along the longitudinal direction X. The portion 38A is formed by stacking the metal base 40, the first base insulation portion 61, and the cover insulation layers 80 one on another along the thickness direction Z. As shown in FIG. 14, the thin-walled portions 38 overlap the actuator 16 in the thickness direction Z.

As shown in FIG. 14, the thickness T31 of the flexure 30 in the first area A1 is less than the thickness T32 of the flexure 30 in the second area A2. In the example illustrated in FIG. 14, the thickness T31 of the flexure 30 in the first area A1 corresponds to the thickness of the thin-walled portions 38 in the portions where the connection portions 73 are respectively located.

In the configuration of the flexure 30 of the ninth embodiment, advantageous effects similar to each of the embodiments described above can be obtained. In the ninth embodiment, in the first area A1, the thin-walled portions 38 are formed to overlap with the actuator 16, and therefore the thickness of the flexure 30 in each of the areas overlapping the actuator 16 can be reduced. By reducing the thickness of the flexure 30, the degree of freedom in designing the thickness of the actuator 16 can be increased.

Tenth Embodiment

FIG. 15 is a partial cross-sectional view schematically showing a suspension 10 according to the tenth embodiment. The tenth embodiment is different from the ninth embodiment in that the thickness of the metal base 40 in the first area A1 is less than the thickness of the metal base 40 in the second area A2.

As shown in FIG. 15, the metal base 40 includes first metal base portions 41 in the first area A1 and second metal base portions 42 in the second area A2. In the first area A1, the flexure 30 includes thin-walled portions 38 formed therein by stacking first metal base portions 41, first base insulation portions 61, first conductor portions 71 and cover insulation layers 80, respectively, one on another along the thickness direction Z.

As shown in FIG. 15, the thickness T31 of the flexure 30 in the first area A1 is less than the thickness T32 of the flexure 30 in the second area A2. Further, in the first area A1, the thin-walled portions 38 including the first metal base portions 41 are formed, the thickness T31 of the flexure 30 in the first area A1 of this embodiment is less than the thickness T31 of the flexure 30 in the first area A1 of the ninth embodiment (shown in FIG. 14). In the configuration of the flexure 30 of the tenth embodiment, advantageous effects similar to each of the embodiments described above can be obtained. Note that in the ninth and tenth embodiments, the thin-walled portions 38 respectively include the first base insulation portions 61 and the first conductor portions 71, but it sufficed if they include at least one group of the first base insulation portions 61 and the first conductor portions 71. Even in such a case, the thickness T31 of the flexure 30 in the first area A1 can be reduced.

In implementing the inventions disclosed in the above embodiments, specific configurations such as the shape of each of the base plate 21, load beam 22, flexure 30, and the like, the specific configuration of each element which constitutes the suspension 10 for disk drives can be changed in various ways.

Note that in the first to eighth embodiments described above, the flexure 30 includes a plurality of pillows 90, it may not have a plurality of pillows 90, in which case, the slider 11 can be brought closer to the dimple 24 side by an amount corresponding to the thickness of the pillows 90.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flexure of a suspension for a disk drive, comprising a metal base and a wiring portion provided along the metal base and including a base insulation layer, a conductor layer overlaid on the base insulation layer, and a cover insulation layer overlaid on the conductor layer, the flexure comprising:

a first area on which an electronic component is mounted and a second area aligned alongside the first area, wherein:

the first area includes a thin-walled portion which overlaps the electronic component and has a thickness less than a thickness of the second area, the conductor layer is provided in each of the first and second areas, a thickness of the conductor layer in the thin-walled portion is less than a thickness of the conductor layer in the second area, the metal base is provided in each of the first and second areas, and a thickness of the metal base in the thin-walled portion is less than a thickness of the metal base in the second area.

2. The flexure of claim 1, wherein:

the base insulation layer is provided in each of the first and second areas, and a thickness of the base insulation layer in the thin-walled portion is less than a thickness of the base insulation layer in the second area.

3. The flexure of claim 1, further comprising:

a pillow on which the electronic component is disposed.

4. The flexure of claim 1, wherein the electronic component is a slider, and the wiring portion in the second area includes a terminal portion electrically connected to the slider.

5. A suspension for a disk drive, comprising:

the flexure of claim 1, and a load beam which the flexure overlaps.

* * * * *